United States Patent [19]

Broadbent

[11] 3,924,062

[45] Dec. 2, 1975

[54] DISC RECORD WITH SKIPPED STANDARD VIDEO INCREMENTS AND CONTINUOUS AUDIO INCREMENTS AND A METHOD AND APPARATUS FOR REPRODUCTION

[75] Inventor: Kent D. Broadbent, San Pedro, Calif.

[73] Assignee: MCA Disco-Vision, Inc., Universal City, Calif.

[22] Filed: Oct. 24, 1972

[21] Appl. No.: 299,892

[52] U.S. Cl. ............ 178/6.6 R; 178/5.6; 178/6.7 A; 179/100.3 V; 274/42 R; 360/11; 360/19

[51] Int. Cl.² ............ H04N 5/76

[58] Field of Search ...... 178/6.6 A, 6.6 DD, 6.6 FS, 178/6.6 SF, 6.7 A, 5.6, 5.8 R; 274/42 R; 179/100.3 V, 100.41 L, 100.4 R, 100.4 C; 360/19, 11, 10, 9, 35

[56] References Cited

UNITED STATES PATENTS

| | | | |
|---|---|---|---|
| 3,371,154 | 2/1968 | Frohbach et al. | 178/5.6 |
| 3,371,156 | 2/1968 | Frohbach et al. | 179/100.3 V |
| 3,430,966 | 3/1969 | Gregg | 274/42 |
| 3,686,436 | 8/1972 | Camras | 178/6.6 SF |
| 3,748,381 | 7/1973 | Strobele et al. | 178/6.6 DD |

*Primary Examiner*—Raymond F. Cardillo, Jr.
*Attorney, Agent, or Firm*—Marvin H. Kleinberg

[57] ABSTRACT

An improved recording format for a video disc is disclosed which only one of the video frames of a consecutive plurality of frames is recorded. The sound corresponding to the recorded video frame and the omitted video frames is multiplexed and written with the recorded frame. On playback, the recorded frame is repeated a sufficient number of times to substitute for the omitted frames and each repeat is accompanied by the sound corresponding to the omitted frames in proper sequential order. A method of achieving this format in a circular or spiral track configuration is disclosed.

11 Claims, 9 Drawing Figures

DISC RECORD WITH SKIPPED STANDARD VIDEO INCREMENTS AND CONTINUOUS AUDIO INCREMENTS AND A METHOD AND APPARATUS FOR REPRODUCTION

BACKGROUND OF THE INVENTION

1. Field of the Invention

This invention relates to a system for storing and retrieving high-frequency information and more particularly to a system for increasing the effective amount of program that can be stored on and retrieved from a given size disc.

2. Description of the Prior Art

Systems have heretofore been developed for recording and reproducing signals at video frequencies upon discs, tapes, or other media. Such systems have utilized, among other things, optical recording upon photosensitive media, electron beam recording on thermo-plastic surfaces and, still other systems provide a reproducible record of video information.

The prior art can generally be divided into systems utilizing photographic surfaces, systems utilizing electron beam sensitive surfaces, magnetic recording systems and, as in the present invention, systems in which a radiant energy beam causes an irreversible change to a surface, thereby "writing" information thereon.

In recording video information on discs, it is known to record the high frequency information either in the form of a continuous spiral track upon a disc wherein the writing transducer (or the reading transducer on playback) is continually translated in a radial direction as the disc is rotated. It is also known in non-video, data storage applications to record information on discs in concentric circular tracks.

To be commercially feasible as an element in a home instrument entertainment system, a "video disc" should be capable of storing, in reproducible form, a reasonable length of "real time" program material. The amount of total information that can be stored on a given disc is, of course, limited by the diameter of the disc, the width of a recorded track, and the lineal data density capable of being either written or reproduced by the system.

In accordance with the present invention, an information format is disclosed which results in a substantial increase in the length of video program material capable of being written and reproduced from a video disc, of reasonable dimensions.

SUMMARY OF THE INVENTION

In accordance with the principles of the present invention, a new formatting of video information on a video disc is employed and new and improved apparatus for recording and playing back the video information in such a new format is provided.

According to the present invention, the video information is recorded either in a series of concentric circular data tracks or in a continuous spiral track. However, instead of recording all of the information that is present in a TV transmission, only one out of a predetermined number of successive sequential video frames is recorded. For the purposes of the present invention, a frame or field will be considered a standard increment of program. As is known, a television transmission includes a series of complete "pictures" or frames, each frame being made up of two interlaced fields. In the context of the present invention, the standard increment of program is at least a complete field although a full frame is employed in the preferred embodiment.

In a first embodiment equally applicable to circular or spiral recording, only alternate standard increments or "frames" are recorded, which immediately reduces the data storage requirement to one half, and doubles the program content of a given disc. Each frame is preferably recorded during one complete revolution of the disc. On playback, each recorded frame is then replayed twice, thereby providing a signal substantially indistinguishable from the received signal. Such a signal could easily be applied to a standard TV receiver.

To prevent the loss of audio information present in the adjacent but non-selected frames, that audio information is retained and is recorded simultaneously with the audio of the selected frames. The audio is preserved and stored without in any way altering or modifying the video standard increments or the normal synchronizing, blanking or other intervals associated with each increment. The complete audio track is thus available, even though a portion of the video information is not recorded. On playback, the simultaneously recorded audio tracks are "separated" so that each replay of a frame is accompanied by a different audio track.

The system of the present invention utilizes a precision lathe for translating the recording "head" along the radius of a rotating video disc. An appropriate optical system directs a writing beam (which has been modulated in accordance with the video information to be recorded) onto the disc surface. The "writing head" moves in a continuous manner from the outer periphery to the interior of the disc as the disc is rotated at a constant speed.

In a preferred embodiment, the information is recorded in a spiral track. An articulated or "ditherable" mirror is interposed in the path of the writing beam. During a first revolution of the disc, the head and the mirror cooperate so that the effect is cumulative and a frame is recorded. During the next revolution, the head and the mirror are oppositely directed so that the motion of the head is offset by the motion of the mirror. At the beginning of the next frame, the writing beam is at the same radial distance as the end of the previously recorded frame and a new frame can then be written in a continuation of the already recorded track.

To form the concentric circular data tracks, the articulated mirror is directed to oppose the radial motion of the head, maintaining the writing beam at a constant radius from the center of the disc until a circular track is complete (i.e., for one complete revolution of the disc). During the next revolution of the disc, no information is recorded and the effect of mirror motion and head movement is cumulative to place the writing beam at the next indexed radial location, spaced a predetermined distance from the previous track.

The resulting recording thus contains a series of concentric data rings, with each ring preferably containing an entire standard increment or video frame and the audio information of the recorded frame and any omitted frames.

In playing back the recorded information, a "reading" beam is directed onto the surface of the video disc through an articulated mirror that is servo-controlled to follow the recorded track in a predetermined program. For the embodiments wherein a single frame is recorded in a single revolution, each track is "read" a sufficient number of times to recreate a flow of video information at whatever rate the information originally existed, and to provide the complete audio information.

For example, if only alternate frames have been recorded, each frame is read twice. If one of three frames is recorded, each frame is read three times. "Stop action" may be achieved simply by "locking" the reading beam on a selected frame and continuously reading that frame while halting the radial motion of the reading head.

If the information has been recorded in a spiral format, on alternate revolutions of the disc, the mirror additively and subtractively combines with the radial motion of the head. If, for example, a $2\mu$ spacing between adjacent tracks is used, the head would be driven at a rate of $1\mu$/revolution of the disc and the mirror also provides at least $1\mu$ of radial motion to the reading beam in either direction.

Reading commences when the head is aligned with the start of a frame. The frame is read once with the mirror motion additively combined with head motion. At the conclusion of the first frame, the head is midway between adjacent tracks and the mirror is deflected in a direction opposite to head motion. Locking on to the beginning of the frame just read, the frame is read again, with the mirror deflecting in the same direction as head movement. At the conclusion of the repeated frame, the head is aligned with the beginning of the next frame which is then read as the mirror continues to deflect in the direction of head movement.

For information recorded in the circular format, the mirror is deflected in the direction of head motion before the head reaches the track and the track is read once as the head approaches. The track is read again as the head recedes from the track. The mirror, in this revolution is deflected in a direction opposite to that of head movement, just compensating for head motion thereby keeping the reading point at the same radial distance for two revolutions.

The system thus described is capable of writing and reproducing video information with a greater flexibility and economy of disc surface than systems heretofore available.

The novel features which are believed to be characteristic of the invention, both as to organization and method of operation, together with further advantages thereof, will be better understood from the following description considered in connection with the accompanying drawings in which several preferred embodiments of the invention are illustrated by way of example.

DESCRIPTION OF THE PREFERRED EMBODIMENTS

Figures 1, 4, 5, 9:
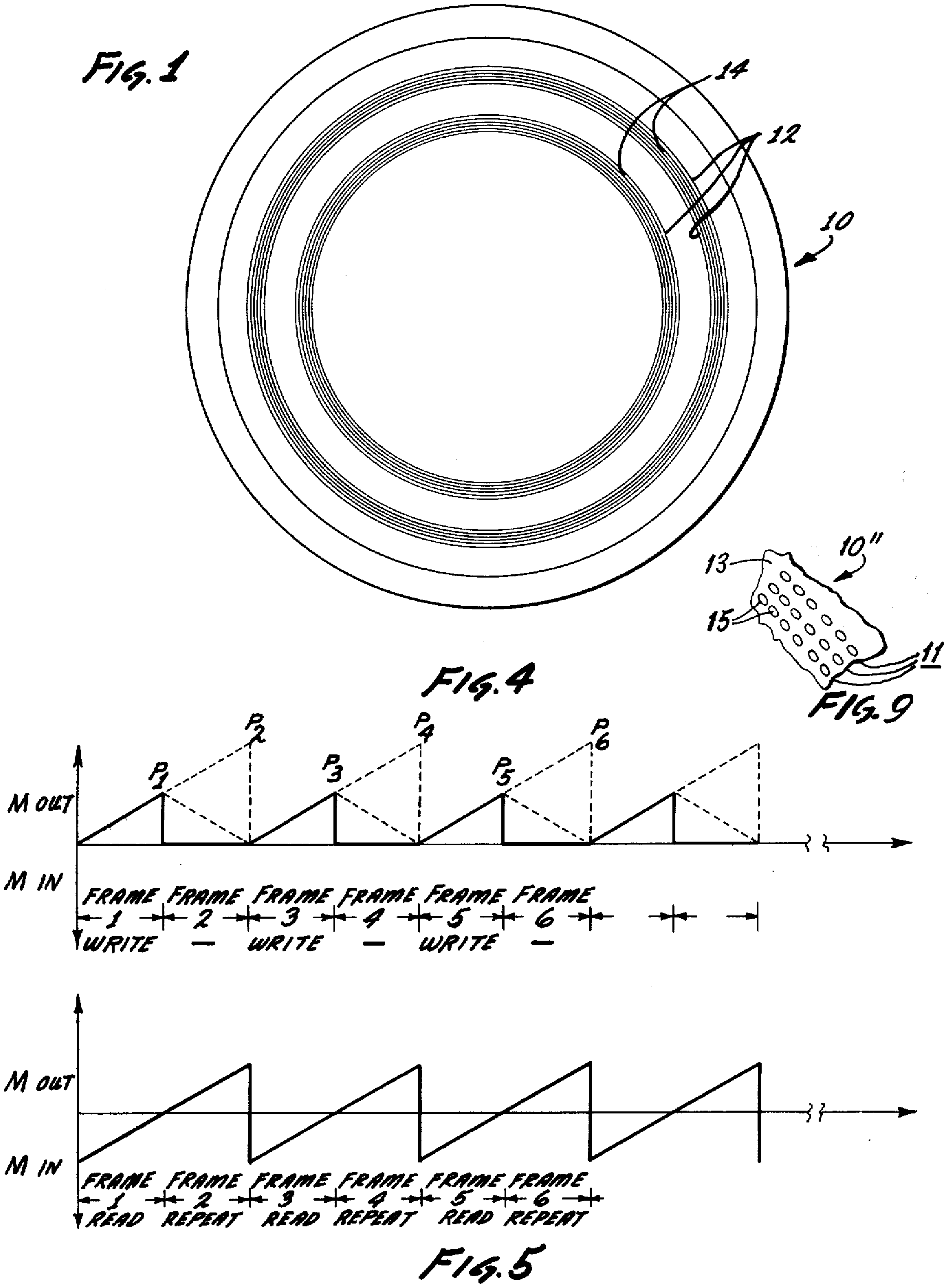
FIG. 1 is a conceptual top view of a disc having video information recorded thereon in accordance with one embodiment of the present invention.
FIG. 4 is the wave form of the driving signal applied to an articulated writing mirror to achieve a circular track, in the apparatus of FIG. 2.
FIG. 5 is a wave form of the signal applied to drive the articulated reproducing mirror in the apparatus of FIG. 3.
FIG. 9 is a fragmentary enlarged portion of a suitable replica video disc.

As shown in FIG. 1, video information is recorded on a disc 10 in concentric circular rings or tracks 12, each separated from an adjacent track by a predetermined distance. In this preferred embodiment, each track contains video signal information describing one complete standard increment or video frame and also the simultaneously recorded audio portion of two frames, the recorded video frame and the audio of an immediately preceding frame, the video of which is not recorded. The first information track is preferably written in the area adjacent the outer periphery of the disc although "inside-out" recording and playback are equally feasible.

It has been found practicable to utilize a track width of approximately one micron with a guard band 14 between tracks which is also on the order of one micron. The spacing between adjacent track centers is then 2 microns.

Although the preferred embodiment is directed to an information format wherein every other video frame is omitted, other information formats may be utilized. In general, if during the recording process, X frames out of every X + 1 consecutive frames flowing in a continuous program were omitted, on playback, each frame that is recorded would be replayed X + 1 times to recover the required constant information flow for the standard TV receiver and to provide a picture and sound that would be acceptable to the viewer. Each recorded video frame would include the sound portions of X + 1 frames suitably multiplexed so that a different sound "track" would accompany each replay of the video frame.

The values of X that are feasible in the above framework, will, of course, depend upon the requirements of the system, and the industry standards that have been adopted. For example, the amount of picture "jerkiness" which can be tolerated goes primarily to the aesthetics of the system and the tolerance of the viewer. Frame rates of 15 per second can easily be utilized without visibly deteriorating program picture quality and frame rates of 10 per second may be acceptable. Depending upon the picture content, even lower frame rates may be tolerated.

In other applications, the field may be considered as the elemental information standard increment. Accordingly, if two fields comprise a frame, Y fields may be omitted out of each Y + 1 successive fields where Y is an odd integer. On playback, each field would be repeated Y + 1 times. As above, the recorded field would include the sound portions of the omitted fields, with provision being made for demultiplexing a different audio segment with each field repetition.

Figure 2:
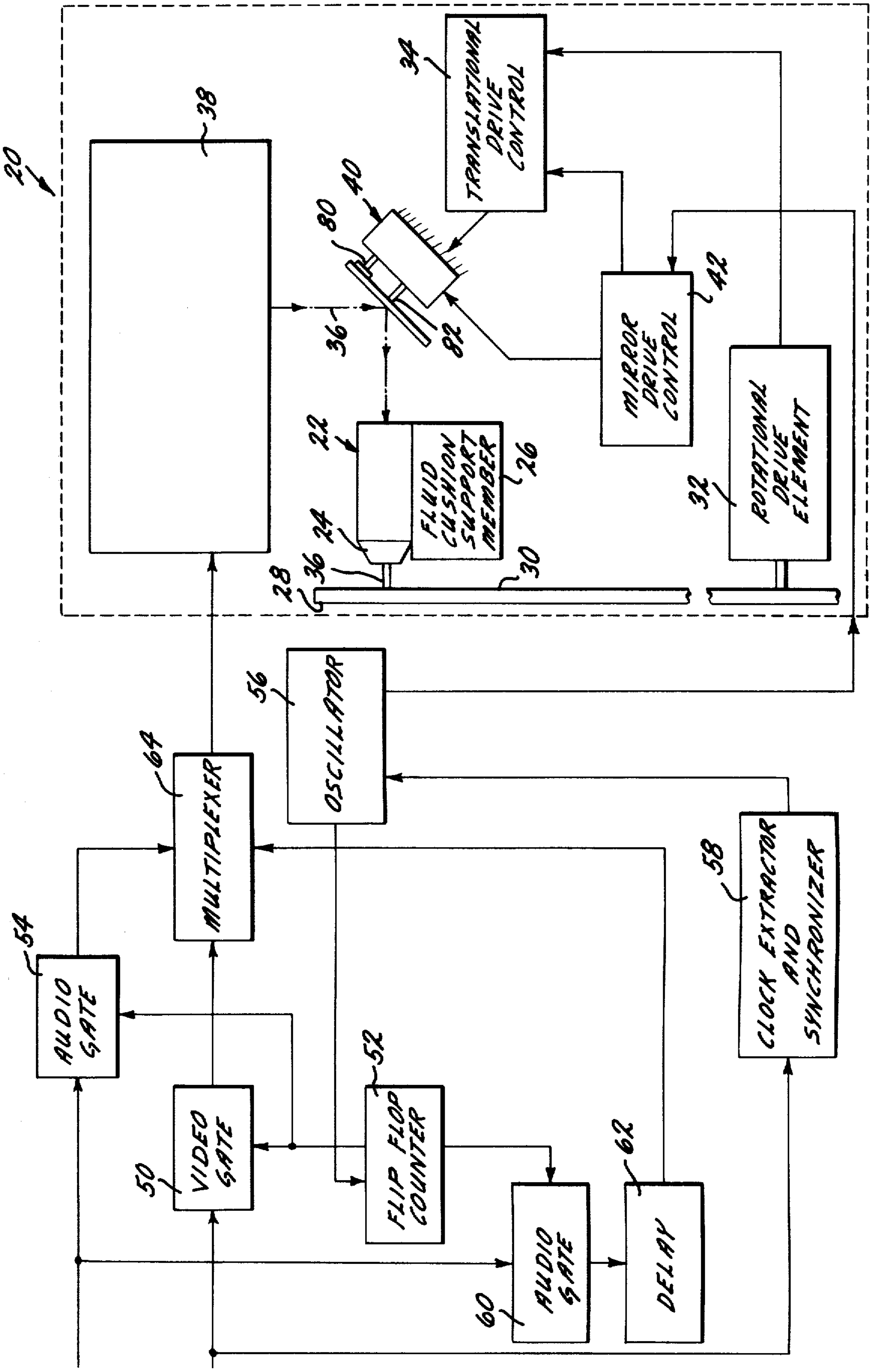
FIG. 2 is a generalized block diagram of recording apparatus in accordance with the principles of the present invention.

In FIG. 2, a writing apparatus is indicated which operates in accordance with the principles of the present invention. The apparatus is similar in general function to that taught in the prior art.

The writing apparatus 20, includes a writing head 22 which is, in the preferred embodiment, a microscope objective lens 24 mounted upon a fluid cushion support member 26. A disc 28 with a surface that responds to applied energy may be constructed in accordance with the teachings of the prior art. Preferably the disc 28 has a very thin film coating 30 of a metal with a reasonably low melting point and a high surface tension. An applied writing beam melts the film and the surface tension causes the meal to coalesce into small droplets, leaving an area devoid of coating. The disc 28 is rotated by a rotational drive element 32, such as a synchronous motor coupled to and cooperating with a write head translational drive element 34, such as a precision lathe.

A translating carriage (not specifically shown) driven by the translational drive element 34 moves the writing assembly 22 in the radial direction relative to the rotating disc 28.

A writing beam 36 which has been modulated by writing circuits 38 receives the video signal to be recorded. The modulated beam 36 is applied to an articulated mirror assembly 50 which directs the beam 36 to the write head 22. The articulated mirror assembly is controlled by a mirror drive control circuit 42, which receives inputs from the rotational drive element 32 and provides an output to the translational drive control 34.

If it is desired to record a transmission in the standard NTSC format in accordance with the teachings of the present invention, only selected ones of the standard 60 fields per second (30 frames per second) are recorded. For example, the embodiment of FIG. 2 as shown is adapted to record the video portion of every other video frame. For example, if the video portion of the second and fourth sequential frames are recorded, the video of the first and third frames is skipped.

In the apparatus of FIG. 2, the input signal is split into a video portion which is applied to a first video gate 50 which is controlled by a counter 52 which, in its simplest mechanization comprises a pair of serially connected flip-flops. A separate audio input is applied to a first audio gate 54 which is also controlled by the counter 52. The flip-flops are sequenced by a precision oscillator 56. The oscillator 56 runs at the vertical sync signal rate and is synchronized with the input video information by a clock extractor and synchronizer 58 which, as shown, obtains the vertical sync pulses from the video input signal.

The output of counter 58 alternately enables and disables video gate 50 and the first audio gate 54 and the complementary output alternately disables and enables a second audio gate 60. Thus, for a first two oscillator 52 pulses corresponding to a first frame, the output of counter 52 is "low." The video and audio signals are blocked by gates 50, 54. However, the second audio gate 60 is enabled and the audio information is applied to a delay device 62. During the third and fourth pulses, the output of counter 52 is "high" and gates 50 and 54 pass the video and audio signals to a multiplexer 64 and the second audio gate 60 is blocked.

The delay device 62 serves to delay the input audio signal for one frame period of 1/30th of a second, which represents one revolution of the disc 28.

At the input to the multiplexer 64 there exists both a complete video frame and its audio signal and the delayed audio portion from the prior frame. The audio information for both the blocked and transmitted frames is thus simultaneously applied to multiplexer 64, which combines the transmitted single frame of video information with the two frames of audio information. The audio information signals are combined by multiplexer 64 in any of the methods known to the art and the composite signal is applied to modulate the writing beam in the writing circuits 38. The combining of the video and audio is accomplished without altering or modifying the video standard increment or the sync, blanking or other intervals normally associated therewith.

Well known techniques are available to translate the writing apparatus 22 in the radial direction with respect to the rotating disc 28. In FIG. 2, the rotational and translational drives 32, 34 are shown as interconnected so that the writing apparatus 22 translates a predetermined incremental distance along the radial path of the disc 28 for each disc revolution. In a preferred embodiment, the wiiting apparatus translates 1$\mu$ for each revolution, thereby requiring two revolutions to shift from track to track in the circular format or in the spiral format.

If the articulated mirror 40 were held, the writing beam 36 would trace a continuous spiral tack on disc surface coating 30 in a manner as shown in the prior art and, as shown, would provide no spacing between adjacent tracks. As discussed above, however, mirror 40 is capable of being articulated about an axis substantially parallel to the disc surface and perpendicular to the beam-disc intersection radius, to vary the position of the beam 36 along the radial path of the disc.

In the illustrated embodiment, a mirror driver 80 is connected to one end of the mirror 40 and is operable to impart angular motion about the central pivot 82. For example, if the driver 82 rotates the mirror 40 in the clockwise direction (as viewed in FIG. 2), it will be seen that the point of intersection of the writing beam 36 and disc surface 30 will be shifted toward the outer periphery of the disc 28.

As described above, video information is to be recorded on the disc, either in the form of concentric circular rings or tracks, or a continuous spiral track each separated from an adjacent track by a predetermined distance. During each revolution of the disc, the track contains video and audio signal information describing one complete video frame and the simultaneously recorded audio portion of an immediately preceding, skipped frame. It will be seen that the video and audio portions are thus recorded without any modification of the video portion of the signal or the normal synchronizing or blanking information associated therewith.

As noted above, it has been found practicable to utilize a track width of approximately 1 micron with a guard band between tracks which is also on the order of 1 micron. The circular track format has been illustrated schematically above in FIG. 1. The spacing between adjacent track centers is then 2 microns.

In the apparatus of the embodiment of FIG. 2, the rotational drive rotates disc 28 at a rate of 1800 rpm, allowing 1/30th of a second or one revolution for the recording of frame, which is the time allotted to each frame in the standard NTSC format. It has been deemed desirable to provide an integral number of fields and thus far, one frame per revolution represents an easily achievable rotational speed for the disc 28.

For each rotation of disc 28, the translational drive 34 continuously translates writing head 22 a predetermined incremental distance along a radial path toward the disc rotational axis. In the embodiment of FIG. 2, the writing head 22 is translated one micron towards the center of the disc 28 for each disc revolution.

For recording a circular track, the articulated mirror 40 maintains writing beam 36 at a constant disc radial position during a given revolution of the disc 28. The angular position of mirror 40 is controlled by mirror drive control 42 which, as show, is preferably synchronized by oscillator 56.

A suitable mirror drive control function for maintaining the radial position of the writing beam constant during a revolution when information is being recorded, is illustrated in FIG. 4. As shown in FIG. 4, the mirror drive control 42 may supply a suitable ramp function wherein the articulated mirror 40 is rotated linearly with respect to time (and the angular position of the disc) to compensate precisely for the translational motion of the writing head 22.

In accordance with the information format, as described above, only every other video frame is written. The precise position of mirror 40 is important only during those time segments when information is actually being recorded on the disc 28. These time segments are indicated in FIG. 4 by the arrows and the legends Frame 1, Frame 2, etc. Further, the frames during which information is being written are identified by the legend "write." When information is not being recorded, for example, during the vertical retrace interval, mirror 40 is returned to a null position to await the completion of the revolution. As writing commences, the writing beam is deflected opposite to the direction of head movement during writing so that the motions are cancelled. In the next revolution, the head will be translated to the starting point for the next circular information track (i.e., at a disc radius two microns less than the immediately preceding track) and the mirror 40 again compensates for heat motion during the writing of the next circular track.

As shown, the system of FIG. 2 is a so-called "open loop" system. Closing each circular track depends upon the proper interaction of the rotational, translational and mirror drives. If desired, a "closed-loop" system may be utilized in which a "read" capability is employed. For example, an initial "perfect" circle may be drawn on the disc with the translational drive stationary. Each subsequent information-bearing circular track can then be created by maintaining a predetermined radial distance away from the immediately preceding circular track.

Still another approach utilizes an "error" detection circuit wherein a "read-after-write" circuit signals, at the end of each circular track, any discontinuity between the radial track position at the start and end of a given track. An appropriate correction signal to the mirror drive control circuitry can be derived to vary the mirror driving function to eliminate the discontinuity.

Figure 6:
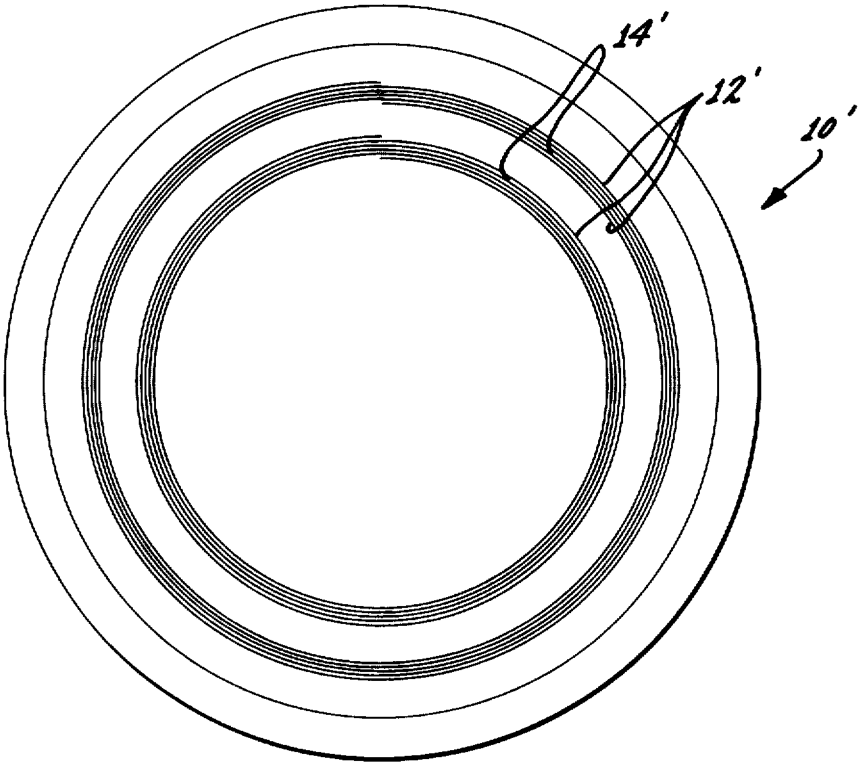
FIG. 6 is an alternative, spiral disc format.
Figure 7:
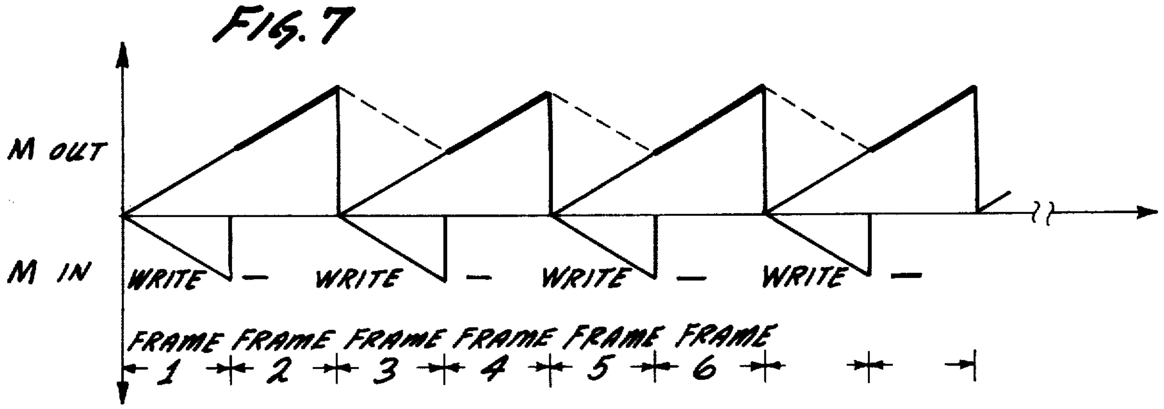
FIG. 7 is a wave form for driving the mirror to write a spiral.

If a spiral track is to be written, as shown in FIG. 6, the mirror drive function is modified as illustrated in FIG. 7. Since the track spacing between centers is $2\mu$ and since the head translates radially by $1\mu$ per revolution, it is necessary during a writing interval for the mirror to deflect the beam in the same direction as head motion. At the end of the revolution, the mirror then is returned to a null position until the head motion brings the head to the correct radial location to record the next frame.

An alternative drive function could avoid discontinuities in the mirror drive and would slowly return the mirror to null during a non-writing revolution. This is indicated in FIGS. 4 and 7 by the dotted waveform in the alternate intervals.

Figure 3:
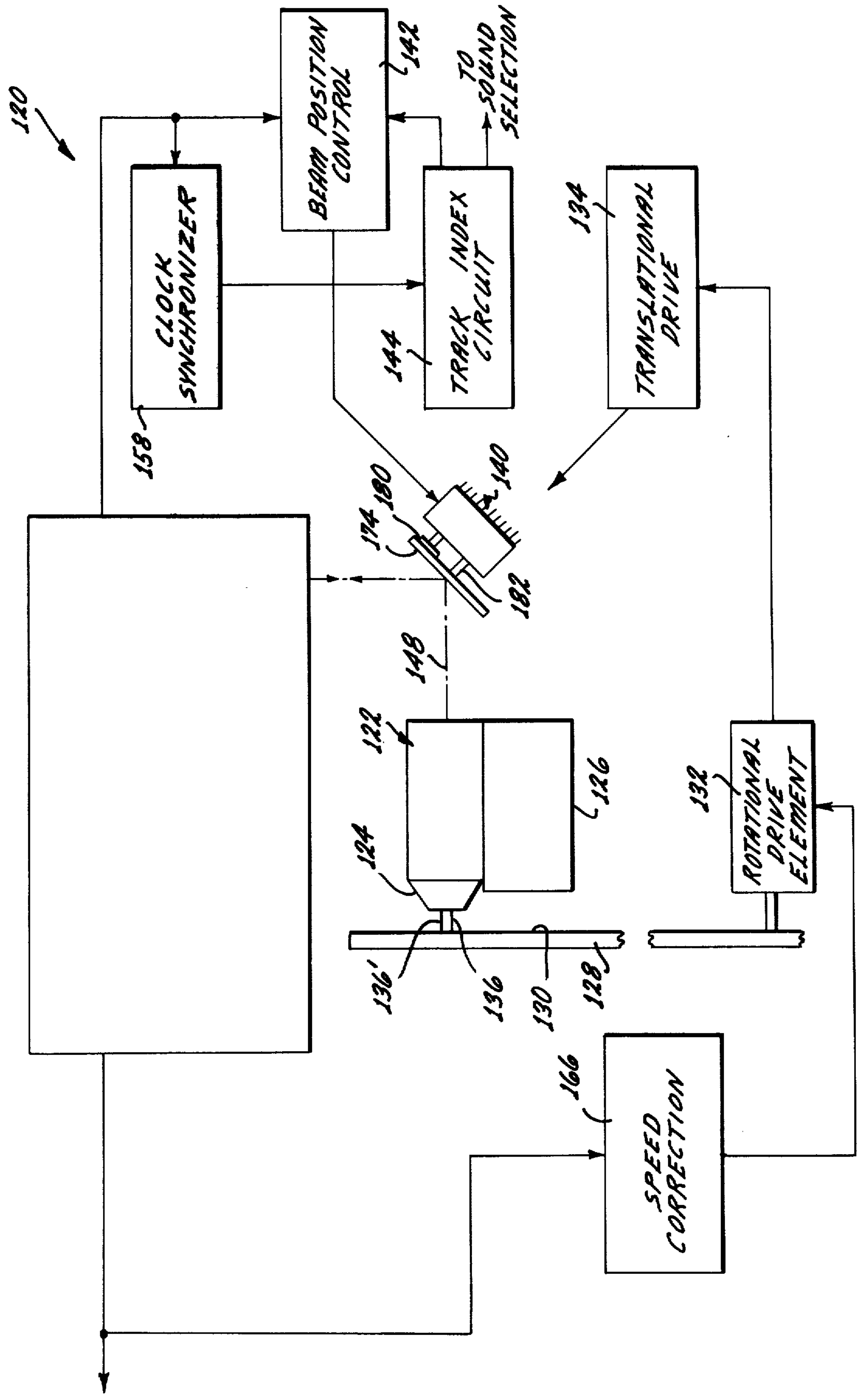
FIG. 3 is a generalized block diagram of reading apparatus constructed in accordance with the principles of the present invention.

FIG. 3 illustrates an embodiment of a playback assembly 120 for reproducing the information recorded in the manner hereinabove described. The playback assembly is similar in general function to that described in the prior art and need not therefore be discussed in great detail.

Briefly, however, a recorded video disc 128 such as disclosed in U.S. Pat. Nos. 3,430,966; 3,658,954; 3,687,664, or U.S. application Ser. No. 735,007, all assigned to the assignee of the present invention is suitably mounted to be rotated by a rotational drive element 132. A reading head assembly 122 is adapted to be translated along the radius of the disc by a translational drive element 134. The rotational and translational drive configurations are similar to that described in connection to the writing operation, supra.

A reading beam 136 is generated in reading circuits 138 and is directed through an optical system, including an articulated mirror 140 to the reading head 122. The beam is then directed to the disc 128 where it interacts with the information recorded on the disc surface 130. The modulated beam 136' reflected from the disc surface 130 returns via the same optical path to the reading circits 138.

The read head 122 includes a lens 124 and a fluid cushion support member 126 similar to that described in connection with the write system 20 of FIG. 2. As in the write system of FIG. 2, the articulated mirror 140 driven by an appropriate beam position control driver 142 directs the unmodulated and modulatedreflected reading beam 136, 136' to and from the correct radial position on the video disc 128 to follow the data tracks accurately.

Figure 8:
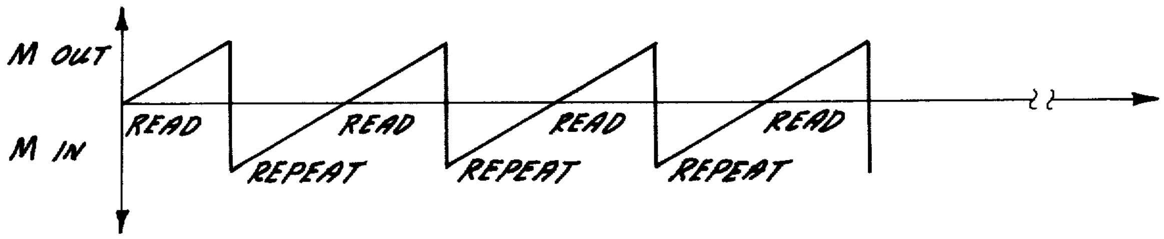
FIG. 8 is a wave form for driving the mirror to read a spiral.

An appropriate drive signal for mirror drive 142 is derived from the reflected, modulated beam 136'. The mirror 140 can be made to "lock" onto the track by appropriate feedback and servo-techniques during reading. When a circular format is employed, an appropriate driving signal is graphically illustrated in FIG. 5. For a spiral format, the driving signal is illustrated in FIG. 8.

As discussed above, the video information is contained either in a series of concentric circular tracks wherein each track is preferably a complete recorded frame or in a continuous spiral wherein each revolution contains a recorded frame. Since each recorded frame includes the video portion of one frame and the audio portion of that frame and of an adjacent non-recorded frame, to supply a utilization apparatus (which may, for example, be a standard home TV receiver) with suitable, real time information, it is necessary to read each frame twice before translating the reading apparatus to the next frame.

A track index circuit 144 provides the beam position mirror-driver control circuit 142 with a suitable indexing signal such as an index pulse which "kicks" mirror 140 by an angular amount appropriate to direct the reading beam from one recorded frame to the next consecutive recorded frame. The track index circuit 144 also provides a control signal to sound demultiplexing circuits so that the proper sound will accompany the selected frame.

The "next" frame is then read the required number of times before the beam is directed to the next, subsequent frame. The track index circuit 144 is preferably synchronized with the vertical retrace signals. Synchronization is accomplished by a clock synchronizer 158 which receives the detected video signal and extracts the appropriate sync signals. In the reading process, the repeated video fram is then combined with the demultimplexed audio information appropriate to that play of the frame to maintain the integrity of the complete video program. The separation and storage of the video and audio is accomplished without modifying or changing the video portion of the sync, blanking or other intervals associated with the video portion of a standard increment. The recombination is therefore easily and simply accomplished.

The output of the reading circuit 120 is in a suitable form to be applied to a desired utilization apparatus, which, as referred to above, may be a standard TV receiver. The output is also applied to a speed correction circuit 166 which is coupled to disc rotational drive element 132. By sampling any of the available sync signals and servoing the rotational drive element 132, the playback signal can be locked into the sampled sync signal to preserve time synchronism and to protect against frequency shifts due to "drift" of the rotational speed of the disc 128.

The appropriate drive signal to the mirror 140, as illustrated in FIG. 5, which is particular to the circular format, indicates that during a first frame, the mirror is initially displaced in the direction of head translation by a predetermined incremental amount. The mirror 140 is then directed in a direction opposite to that of head motion while a frame is read and then repeated. At the end of the repetition, the mirror is again "kicked" in the direction of head motion to select the next concentric track and the process is repeated.

In the operation contemplated by FIG. 5, it is understood that when a frame is first read, the head is midway between the two tracks and mirror motion exactly compensates for the head motion, effectively reading the circular track. At the conclusion of the first reading of the frame, the reading head is then centered under the track which has just been read. The head continues to translate and the motion of the head is exactly compensated by the mirror until the conclusion of the repeated frame. At that time the head is again midway between tracks and the mirror directs the beam in the direction of head travel to pick up the next track.

Similarly, and with reference to FIG. 8, when a spiral format is employed, the reading is commenced with the head in alignment with the track. The mirror is deflected in the direction of head motion to read an entire frame. At this time, the head is midway between adjacent tracks and the mirror is "kicked" to the beginning of the track. The mirror again directs the beam in the direction of head travel while the frame is repeated and continues to direct the beam for a second revolution, thereby reading the next frame. It will be seen that at the beginning of each new frame, the head is aligned with the track. When repeating a frame, the head is midway between adjacent tracks.

Alternative embodiments could be employed which make use of the wide range of displacement available to the mirror 140, on the order of several mils. This flexibility is necessary in order to maintain a "lock" on the track in the presence of shock and vibration to the entire system, which could result in relative radial motion of that magnitude as between the head and the disc.

Turning next to FIG. 9, there is shown a greatly enlarged portion of a video disc such as is described and shown in assignee's prior patents, supra. A planar disc 10'' includes a plurality of concentric information tracks 11, each of which includes physical features representative of and corresponding to a standard increment of video program, which in the preferred embodiment is a frame. The disc surface 13 between tracks 11 is devoid of information and, as shown, is substantially planar.

The physical features representing program information are in the form of discrete, deformities or discontinuities 15 that are out of the plane of the surface 13 and therefore affect the optical characterstics of the disc 10''. Since the physical features may be considered a digitized form of a frequency modulated signal, each deformity or discontinuity 15 is approximately the width (in the radial direction) ascribed to an information track 11 and, which, collectively, are the information track. The information content, then is the circumferential dimension of each discontinuity 15 and in the spacing between adjacent discontinuities 15. When the disc 10'' is rotated at its normal playback speed of 1800 rpm, the reading apparatus perceives the stored information as a frequency modulated signal train which, as noted above, can be directly utilized in a conventional TV receiver.

Although the embodiments above described are particularly directed to information formats wherein every other video frame is omitted, yet other information formats may be employed. In general, if during the recording process, X number of frames out of every X + 1 frames flowing in a continuous program were omitted, on playback, each recorded frame if replayed X + 1 times would provide the required constant information flow for the requirements of, for example, a standard TV receiver. Obviously, to produce a picture and sound that would be acceptable to the viewer, all of the audio information of the omitted frames would have to be recorded so that each repeat of a video frame could be accompanied by a different audio frame. Obviously some repetition of audio frames might be tolerated without serious objection.

Thus there has been shown a system for increasing the program material that can be recorded on and retrieved from a video disc of given size operating at a given speed. In the preferred embodiment, one of every two video frames is recorded with the sound portion of both the recorded and omitted frames.

What is claimed as new is:

1. An extended play video disc record comprising:

a disc member having a substantially planar disc surface with variable characteristics portions representing a standard increment of video information recorded thereon, and including more than one standard increment of audio information recorded simultaneously therewith, said variable characteristics portions being discontinuities out of the plane of the surface corresponding to information, said discontinuities being generally disposed in a substantially circular path, each discontinuity having a constant dimension in the radial direction and a constant maximum dimension in the direction perpendicular to said surface, the length of each discontinuity in the circumferential direction and the distance between adjacent discontinuities in the circumferential direction representing the stored information and collectively forming a plurality of mutually spaced information tracks extending circumferentially around the disc, representing an ordered, segmented video program, whereby each standard increment of video information is adapted to be read more than once, each time with a different audio information standard increment to provide a continuous program presentation.

2. The video disc of claim 1, above, wherein each video program standard increment is a frame and each information track has recorded thereon the video information of only alternate frames of a transmission and recorded simultaneously therewith the audio information of the recorded frame and the audio information of an adjacent, omitted frame.

3. The video disc of claim 1, above, wherein the information track is arranged in a plurality of concentric circles, each containing a complete video information standard increment.

4. The video disc record of claim 1 wherein each 360° of information track has recorded thereon a sequential video program information increment and at least two audio information increments, whereby a sequential plurality of said tracks has a video program segment recorded thereon, including only alternate video increments together with audio increments corresponding to omitted video increments of the program segment.

5. The video disc of claim 1, above, wherein the information tracks are arranged in a continuous spiral, each turn containing a complete video information standard increment.

6. The video disc record of claim 1 wherein a first 360° of track has one of X successive video signal information standard increments and the X successive audio information standard increments associated therewith recorded thereon, the next successive sequential track having one of the next X video signal information standard increments and the X successive audio information standard increments associated therewith recorded thereon, whereby only one of every X successive video signal information standard increments with all of the audio standard increments is recorded where X is an integer greater than 1.

7. The video disc of claim 6, above, wherein each video signal information standard increment has recorded simultaneously therewith the audio information standard increments associated with X video signal standard increments.

8. The method of playing back an extended play video disc record having a substantially planar surface and having discontinuities out of the plane of the surface corresponding to information, said discontinuities being arranged in mutually spaced information tracks in a substantially circular path, ech discontinuity having a constant dimension in the radial direction and a constant maximum dimension in the direction perpendicular to said planar surface, the length of each discontinuity in the circumferential direction representing stored information, the stored information comprising selected standard video increments recorded thereon each combined with more than one accompanying audio increment, the method comprising the steps of:

a. reading a recorded standard video increment;
b. extracting a first audio increment from said recorded standard video increment;
c. combining said standard video increment with said first audio increment for application to a utilization device;
d. repeating said recorded standard video increment;
e. extracting a second audio increment from said recorded video increment; and
f. combining said second audio increment with the repeated standard video increment for application to the utilization device.

9. The method of claim 8, above, wherein the extended play video disc has the audio increments from an omitted video increment combined with the video and audio of a selected increment, further including the steps of g. reading the next recorded video program increment; and
h. repeating steps (b) through (f).

10. Apparatus for playing back an extended play video disc record having a substantially planar surface and having discontinuities out of the plane of the surface corresponding to information, said discontinuities being arranged in mutually spaced information tracks in a substantially circular path, each discontinuity having a constant dimension in the radial direction and a constant maximum dimension in the direction perpendicular to said planar surface, the length of each discontinuity in the circumferential direction representing stored information the stored information comprising selected standard video increments recorded threon each combined with more than one accompanying audio increment, said apparatus comprising the combination of:

a. first means for reading a recorded standard video increment;
b. second means coupled to said first means for selectively extracting a first audio increment from said recorded standard video increment;
c. third means coupled to said first and second means for combining said standard video increment with said first audio increment for application to a utilization device; and
d. fourth means coupled to said first means for repeating said recorded standard video increment on said repeat playback, whereby a second audio increment is extracted from said recorded video increment and combined with the repeated video increment for application to the utilization device.

11. Apparatus of claim 10, above, wherein said fourth means include means responsive to synchronization signals in said video increment for generating gating signals; said second means being operable in response to applied gating signals for selectively extracting first and audio increments.

* * * * *